United States Patent [19]

Kojima et al.

[11] 4,362,863
[45] Dec. 7, 1982

[54] PROCESS FOR PRODUCTION OF POLYIMIDE RESINS

[75] Inventors: Makoto Kojima; Hideki Yane, both of Ibaraki, Japan

[73] Assignee: Nitto Electric Industrial Co., Ltd., Osaka, Japan

[21] Appl. No.: 191,618

[22] Filed: Sep. 29, 1980

[30] Foreign Application Priority Data

Sep. 28, 1979 [JP] Japan .............................. 54-126193

[51] Int. Cl.³ ............................................. C08G 69/26
[52] U.S. Cl. .................................................. 528/353
[58] Field of Search ............... 528/351, 352, 353, 336, 528/222, 233, 224, 179, 183, 187, 188, 189, 12, 21, 23

[56] References Cited

U.S. PATENT DOCUMENTS

| | | | |
|---|---|---|---|
| 3,179,632 | 4/1965 | Hendrix | 528/351 |
| 3,575,891 | 4/1971 | Blanc | 528/351 |
| 3,673,145 | 6/1972 | Minami et al. | 528/351 |
| 3,988,303 | 10/1976 | Korshak et al. | 528/351 |

FOREIGN PATENT DOCUMENTS 47-19615  6/1972  Japan .................................. 528/351

*Primary Examiner*—Lester L. Lee
*Attorney, Agent, or Firm*—Sughrue, Mion, Zinn, Macpeak and Seas

[57] ABSTRACT

A process for producing an aliphatic polyimide resin is described, comprising reacting an aliphatic tetracarboxylic acid with a diamine in the presence of a second acid having a higher electrolytic dissociation constant than the aliphatic tetracarboxylic acid.

10 Claims, No Drawings

PROCESS FOR PRODUCTION OF POLYIMIDE RESINS

BACKGROUND OF THE INVENTION

1. Field of the Invention

This invention relates to an improved process for producing an aliphatic polyimide resin from an aliphatic tetracarboxylic acid and a diamine.

2. Description of the Prior Art

In general, polyimides are produced by reacting a tetracarboxylic dianhydride or a derivative thereof with diamines or diisocyanates. As is well known in the art, polyimides thus-produced have excellent thermal, electrical and mechanical properties, but they are generally not sufficiently satisfactory in flexibility, moldability, solubility, and other properties.

Aromatic polyimides are particularly subject to the disadvantages as described above. In commercially producing the aromatic polyimide resin, a solution of a polyamide acid, i.e., a polyimide precursor, is prepared, and after molding, the polyamide acid is converted into an imide by heating or using a cyclization-dehydrating agent such as acetic anhydride, since the aromatic polyimide resin itself is insoluble in solvents and infusible. In this case, therefore, a large amount of expensive polar organic solvent, e.g., dimethylformamide, dimethylacetamide, N-methyl-2-pyrrolidone or the like is required, and the solution is inferior in stability because of ring closure, moisture absorption, etc., which occur during the storage thereof.

The aromatic polyimide resins, therefore, are used only in limited industrial applications irrespective of their excellent characteristics; that is, they have been used in particular situations where their particular high qualities are required.

On the other hand, those polyimides obtained by using aliphatic tetracarboxylic acids as an acid component have significantly higher solubilities in solvents. Therefore they have good workability in the state of solution, and inexpesive solvents can be used in preparing such solutions. Thus it is possible to use such aliphatic polyimide resins in a wide variety of industrial applications such as an electrical insulative material, a varnish, an adhesive, a film, and so forth.

In the production of these aliphatic polyimide resins, various problems occur because of the strong interaction between the aliphatic carboxyl group and amine group. For example, the groups form rigid salts, sometimes preventing the reaction from proceeding uniformly, and in proceeding sufficiently the reaction to obtain polymeric products, cross-linking and gelation may easily occur during the reaction. This reduces the solubility of the polyimide resins in organic solvents, and adversely affects the properties of the polyimide resins, particularly flexibility, moldability, etc. Moreover, in attempting to obtain high polymeric products by allowing the reaction to proceed sufficiently, the desired product may not be obtained.

SUMMARY OF THE INVENTION

It has now been found according to this invention that the disadvantages heretofore encountered in the reaction of aliphatic tetracarboxylic acids and diamines can be effectively overcome.

This invention, therefore, provides a process for producing an aliphatic polyimide resin by reacting an aliphatic tetracarboxylic acid with a diamine in the presence of a second acid having a higher electrolytic dissociation constant than the aliphatic tetracarboxylic acid.

DETAILED DESCRIPTION OF THE INVENTION

Aliphatic tetracarboxylic acids useful in this invention include tetracarboxylic acids of butane, pentane, hexane, cyclopentane, bicyclohexene, etc., in which the four carboxyl groups are bonded to different carbon atoms and wherein at least two of the carboxyl groups are bonded to carbon atoms which are adjacent to each other. The carbon atom chain to which the carboxyl groups are bound may be substituted by various substituents, such as a halogen atom, an alkyl group, an alkoxy group, nitro group or cyano group. The tetracarboxylic acid may be partially replaced by dicarboxylic acids, tricarboxylic acids, etc.; that is, may be used in combination with dicarboxylic acids and tricarboxylic acids, to obtain similar results. Di- and tricarboxylic acid can be used in an amount up to 50 mol%.

Diamines useful in this invention include those represented by the formula

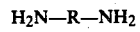

$$H_2N-R-NH_2$$

wherein R is a divalent group containing at least two carbon atoms. Usually, R is an aromatic group, an aliphatic group, an alicyclic group, a heterocyclic group or the like or a mixture thereof. Preferred among these groups is an aromatic group. Two or more of these groups may be bound together by a hetero atom, an alkylene group,

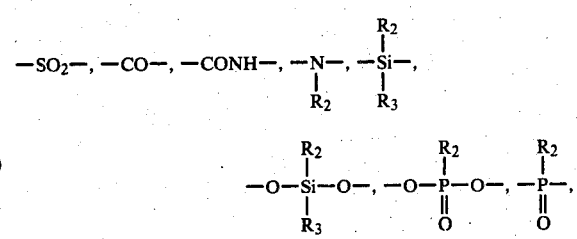

etc. (wherein $R_2$ and $R_3$ each represents an alkyl group, a cycloalkyl group and an aryl group). Additionally, R may contain substituents which do not react with the amino group, carboxyl group or their derivatives under the reaction conditions. This is because these groups improve desired properties of formed polymers, e.g., solubility, moldability, adhesive properties, etc., and chemical and physical modifications of polymers containing these groups enable impartation of more preferred properties.

Examples of such diamines include m-phenylenediamine, p-phenylenediamine, 4,4'-diaminodiphenylmethane, 4,4'-diaminodiphenylethane, 4,4'-diaminodiphenylpropane, benzidine, 4,4'-diaminodiphenylsulfide, 4,4'-diaminodiphenylsulfone, 3,3'-diaminodiphenylsulfone, p-bis(4-aminophenoxy)benzene, m-bis(4-aminophenoxy)benzene, 4,4'-diaminodiphenyl ether, 1,5-diaminonaphthalene, 3,3'-dimethyl-4,4'-diaminobiphenyl, 3,4'-diaminobenzanilide, 4-(p-aminophenoxy)-4-aminobenzanilide, 3,3'-diamino-diphenyl ether, 3,3'-dimethoxybenzidine, 2,4-bis(β-amino-tert-butyl)toluene, bis(p-β-amino-tert-butylphenyl)-ether, m-xylilenediamine, p-xylilenediamine, di(p-aminocyclohexyl)methane, hexamethylenediamine, heptamethylenediamine, 4,4-dimethylheptamethylenediamine, 3-methoxyheptamethylenediamine, 2,11-diaminododecane, 1,4-diaminocyclohexane, 2,2'-diaminodiethyl ether, 2,2'-diaminodiethyl thioether, 3,3'-diaminodipropoxyethane, 2,6-diaminopyridine, guanamine, 2,5-diamino-1,3,4-oxadiazole, 2-(3'-aminophenyl)-5-aminobenzoxazole, bis(4-aminophenyl)-phosphineoxide, bis(4-aminophenyl)diethylsilane and the like. They can be used alone or as a mixture thereof. The use of these diamines in combination with triamines or tetramines which are usually used is also included in the scope of this invention.

The second acids in the presence of which the above two components are reacted are preferably those having electrolytic dissociation constants of at least about $1 \times 10^{-3}$, i.e., those acids which are stronger than tetracarboxylic acids and do not materially hinder the reaction of the tetracarboxylic acid(s) and diamine(s) can be used in this invention. Such strong acids include inorganic acids such as hydrochloric acid, nitric acid, sulfuric acid, phosphoric acid, sulfurous acid, nitrous acid, perchloric acid, etc., organic acids such as 2,4,6-trinitrophenol, 2,4-dinitrophenol, phthalic acid, formic acid, p-toluenesulfonic acid, trichloroacetic acid, dichloroacetic acid, chloroacetic acid, etc., and so on.

While the details of the mode of action of these acids is not clear, it is believed that they serve to weaken the strong interaction between aliphatic tetracarboxylic acids and diamines.

The amount of the second acid added is from 0.01 to 1.0% by weight, and preferably 0.1 to 0.5% by weight based upon the total weight of the reaction system (reactants plus the solvents). In lesser amounts than 0.01% by weight, no effect is observed. In greater amounts than 1.0% by weight, no more effect is obtained and contrarily environmental problems, corrosion, etc., may occur.

The reaction of tetracarboxylic acids and diamines according to this invention can usually be conveniently carried out in an organic solvent at a temperature of from ambient temperature to 250° C. In the practice of this invention, the ratio of aliphatic tetracarboxylic acid to diamine is not critical although they are generally reacted in nearly equimolar amounts. In some cases, this invention can effectively be carried out even when the reaction is a part of another reaction. That is, in a complex reaction system in which a reaction system of an aliphatic tetracarboxylic acid and a diamine and other reaction system are co-present, when the complex reaction system becomes creamy by a salt formation in the aliphatic tetracarboxylic acid/diamine reaction system, ununiform heating causes, and cross-linking and gelation occur, resulting in preventing formation of a linear polymer. On the other hand, addition of the second acid according to the technique of this invention can overcome this problem. For example, in case that imidation reaction of this invention is simultaneously carried out in an esterification reaction system, the presence of the second acid can prevent adverse influences due to the salt formation.

Solvents which can be used in the reaction of aliphatic tetracarboxylic acids and diamines include N,N-dimethylformamide, N,N-diethylformamide, N,N-dimethylacetamide, N-methyl-2-pyrrolidone, N-methylcaprolactam, dimethylsulfoxide, tetramethylenesulfone, tetramethyl urea, hexamethylphosphamide, pyridine, quinoline, γ-butyrolactone, N-acetyl-2-pyrrolidone, phenol, cresols, glycols, cellosolves, carbitols, water-soluble solvents, and water. The amount of the solvent used is from 10 to 95% by weight based upon the total weight of the reaction system, but the effect of this invention is greater with increasing the reaction concentration.

The presence of the strong acids of this invention in the reaction of aliphatic tetracarboxylic acids and diamines eliminates the salt formation that heretofore caused various problems in the production of polyimides and difficulties in producing high polymeric products thereof owing to cross-linking and gelation. Furthermore, it provides aliphatic polyimides having improved flexibility, moldability, etc.

The following examples and reference examples are provided to illustrate this invention in greater detail.

EXAMPLE 1

117 g (0.5 mol) of 1,2,3,4-butanetetracarboxylic acid, 100 g (0.5 mol) of diaminodiphenyl ether, 506 g of N-methyl-2-pyrrolidone, 100 g of xylene, and 1 ml of nitric acid were placed in a 1 liter three-necked flask equipped with a thermometer, a condenser with a trap, and a stirrer. This mixture was stirred while the temperature was raised to from 180° C. to 190° C. At this temperature, the reaction proceeded for 30 hours while distilling off water to obtain a varnish with a viscosity of 430 poises (measured at 30° C.) and a concentration (the percent polyimide resin in the total varnish composition) of 28% (dried at 200° C. for 2 hours).

The varnish resin was reprecipitated from methanol and dried. The relative viscosity ($\eta$ inh) (measured at 30° C. at a concentration of 0.5 g/100 ml in N-methyl-2-pyrrolidone solvent) was 0.7.

Upon coating this varnish on a glass plate and heat-drying at 270° C. for about 1 hour, a tough film was obtained.

REFERENCE EXAMPLE 1

The procedure of Example 1 was repeated with the exception that no nitric acid was added. After about 20 hours from the start of the reaction, gelation took place, and no high polymeric products as in Example 1 could be obtained.

EXAMPLE 2

234 g (1.0 mol) of 1,2,3,4-butanetetracarboxylic acid, 198 g (1.0 mol) of 4,4'-diaminodiphenylmethane, 288 g of industrial cresol, and 1 ml of nitric acid were placed in a 1 liter three-necked flask equipped with a thermometer, a condenser with a trap, and a stirrer. This mixture was stirred while the temperature was raised to from 180° C. to 190° C. over a period of about 1.5 hours. During this period, water was distilled off at 130° to 140° C. At 180° to 190° C. the reaction was carried out for about 3 hours. At the end of the reaction, the reaction mixture was diluted with industrial cresol to obtain an enamel varnish having a viscosity of 32.1 poises (measured at 30° C.) and a concentration of 30.1% (after being dried at 200° C. for 2 hours).

This enamel varnish was coated six times on a copper wire with a core wire diameter of 1.0 mm $\phi$ (diameter) at a temperature of 410° C. and a rate of 5 m/min in a 3.0 m long vertical furnace, whereby an enameled wire having good appearance was obtained.

EXAMPLE 3

The procedure of Example 2 was repeated with the exception that 0.5 g of p-toluenesulfonic acid was used in place of nitric acid. In the same manner as in Example 2, the reaction proceeded and a similar enamel varnish was obtained. On coating this enamel varnish on a copper wire in the same manner as in Example 2, an enameled wire having good appearance was also obtained.

REFERENCE EXAMPLE 2

The procedure of Example 2 was repeated with the exception that no nitric acid was used. When the heat-stirring was started, a salt was formed at 80° C. and the reaction system became creamy. In this case, dissolution of the salt required additional about 2 hours and the overall period of time to reach a reaction temperature of 180° to 190° C. was about 3.5 hours. As a result, it became very difficult to continue the stirring. Therefore, in order to avoid local heating or remove the formation of hot spots, more moderate heating conditions had to be employed to gradually dissolve the salt and to continue the reaction, to thereby obtain a varnish.

Upon coating the above-obtained enamel varnish on a copper wire, the surface layer of the enameled wire contained foams which exerted adverse influences on the characteristics of electric wire. Thus, this enameled wire was inferior to those obtained in Examples 2 and 3.

EXAMPLE 4

In the same apparatus as used in Example 1, 234 g (1.0 mol) of 1,2,3,4-butanetetracarboxylic acid, 198 g (1.0 mol) of 4,4'-diaminodiphenylmethane, 100 g of triethylene glycol, and 1 ml of nitric acid were placed. This mixture was stirred while heating at about 110° C. for about 6 hours, to obtain a resin having an acid value of 1.955 meq/g. At this point, the reaction was stopped, and aqueous ammonium solution was dropwise added thereto to form an ammonium salt of a polyimide precursor.

The thus-obtained aqueous composition of the polyimide precursor was diluted with purified water to obtain a water-soluble enamel varnish having a viscosity of 11 poises (measured at 30° C.) and a concentration of 42.5% (dried at 200° C. for 2 hours).

Upon coating the thus-obtained water-soluble enamel varnish on a 1 mm $\phi$ copper wire in the same manner as in Example 1, an enameled wire having excellent appearance was obtained.

REFERENCE EXAMPLE 3

The procedure of Example 4 was repeated, with the exception that no nitric acid was used. When the heat-stirring was started, a salt was formed at about 80° C., and the whole system solidified, though the reaction temperature could easily be raised to 110° C. without any problem in Example 4.

Therefore, in order to avoid the heterogeneous reaction, more moderate heating conditions were employed and a long period of time was spent to dissolve the salt, and then the reaction was again continued. The salt dissolution required additional about 3.5 hours.

As a result, a water-soluble enamel varnish was obtained which was similar to that of Example 4. On coating the enamel varnish on a 1 mm $\phi$ copper wire in the same manner as in Example 4, foaming was observed and the appearance was inferior to that of Example 4.

The conventional methods of producing aliphatic polyimides, as described above, suffer from disadvantages in that salt formation results from the strong interaction between aliphatic carboxyl groups and diamines, and in that cross-linking and gelation easily occur, since two or more aliphatic carboxyl groups having high reactivity are present. Particularly, in obtainint high molecular weight polymers, these conventional suffer from the defect that desired high polymer polyimides cannot be obtained.

This invention overcomes the above disadvantages and enables the reaction to proceed smoothly. Thus, the industrial value of this invention is great and the usefulness of the aliphatic polyimides can be fully exhibited.

While the invention has been described in detail and with reference to specific embodiments thereof, it will be apparent to one skilled in the art that various changes and modifications can be made therein without departing from the spirit and scope thereof.

What is claimed is:

1. A process for producing an aliphatic polyimide resin by reacting an aliphatic tetracarboxylic acid with a diamine represented by the formula $H_2N-R-NH_2$, wherein R is a divalent group containing at least two carbon atoms, wherein the improvement comprises conducting the reaction in the presence of a second acid having a higher electrolytic dissociation constant than the aliphatic tetracarboxylic acid in an amount of from 0.01 to 1.0% by weight based on the total weight of the reaction system.

2. A process as in claim 1 wherein the reaction is carried out in an organic solvent.

3. A process as in claim 1 wherein the acid has an electrolytic dissociation constant of at least about $1 \times 10^{-3}$.

4. A process as in claim 1 or 2 wherein the second acid is selected from the group consisting of hydrochloric acid, nitric acid, sulfuric acid, phosphoric acid, nitrous acid, sulfurous acid, perchloric acid, 2,4,6-trinitrophenol, 2,4-dinitrophenol, phthalic acid, formic acid, p-toluenesulfonic acid, trichloroacetic acid, dichloroacetic acid and chloroacetic acid.

5. A process as in claim 1 or 2 wherein the amount of the second acid is from 0.1 to 0.5% by weight, based on the total weight of the reaction system.

6. A process as in claim 1 or 2 wherein R is an aromatic group.

7. A process as in claim 2 wherein the amount of the organic solvent used is from 10 to 95% by weight, based on the total weight of the reaction system.

8. A process as in claim 3, wherein said acid is an inorganic acid.

9. A process as in claim 3, wherein said acid is nitric acid.

10. A process as in claim 3, wherein said acid is p-toluenesulfonic acid.

* * * * *